United States Patent [19]

Andersen

[11] Patent Number: 4,457,072

[45] Date of Patent: Jul. 3, 1984

[54] CROSSHEAD AND BOLSTER SPACING CONTROL FOR SERVO CONTROLLED PRESS

[75] Inventor: Dennis H. Andersen, Minnetonka, Minn.

[73] Assignee: MTS Systems Corporation, Eden Prairie, Minn.

[21] Appl. No.: 366,149

[22] Filed: Apr. 7, 1982

[51] Int. Cl.[3] .......... G01B 7/02

[52] U.S. Cl. .......... 33/143 L; 33/147 N; 33/181 R

[58] Field of Search .......... 33/143 G, 143 L, 147 K, 33/147 N, 178 E, 181 R, DIG. 5

[56] References Cited

U.S. PATENT DOCUMENTS

| | | | |
|---|---|---|---|
| 1,708,333 | 4/1929 | Smith | 33/DIG. 5 |
| 2,208,910 | 7/1940 | Pampel et al. | 33/147 N |
| 2,822,620 | 2/1958 | Ulfeldt | 33/143 G |
| 3,082,536 | 3/1963 | McClung | 33/143 G |
| 3,839,944 | 10/1974 | Swift | 92/5 R |
| 4,030,202 | 6/1977 | Fadl et al. | 33/147 K |
| 4,118,963 | 10/1978 | Eibe | 33/182 |
| 4,385,444 | 5/1983 | Possasti et al. | 33/143 L |

*Primary Examiner*—Richard R. Stearns
*Attorney, Agent, or Firm*—Kinney & Lange

[57] ABSTRACT

A transducer arrangement provides a feedback signal which indicates the position of a first part relative to a base and when a second movable part is positioned adjacent the first part the transducer provides a signal indicating the spacing between the two parts. Specifically the transducer provides for spacing control between the two halves of a mold mounted in a press wherein a crosshead moves a substantial distance and carries one part of the mold (the upper half) relative to the lower mold part. Hydraulic actuators act on the lower part of the mold to provide the molding force when the mold parts are close together. The transducer is mounted in a housing and arranged to provide a signal used for controlling the hydraulic actuators to control the spacing of the two molds parts unitl the mold parts are separated a known amount, after which the hydraulic actuators are controlled by sensing the spacing of one mold half relative to the base of the press.

8 Claims, 6 Drawing Figures

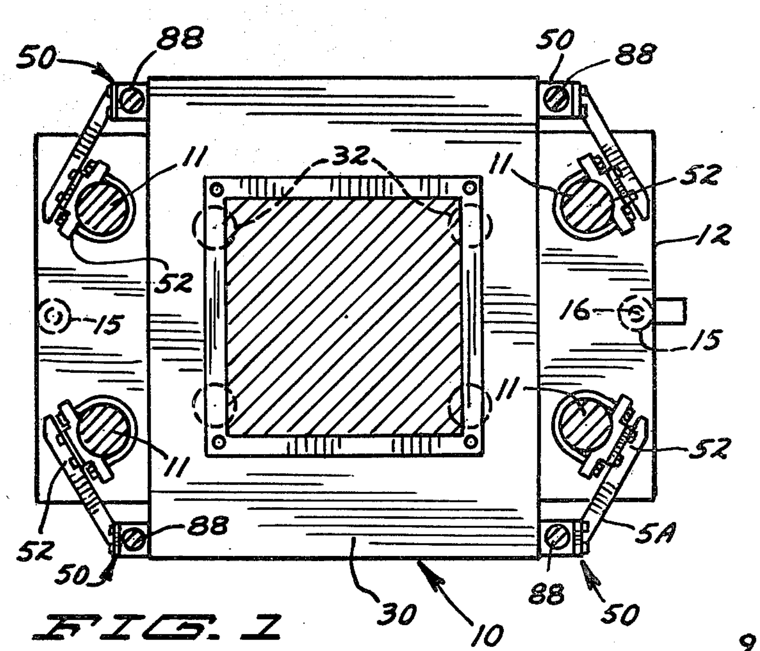
FIG. 1
FIG. 2
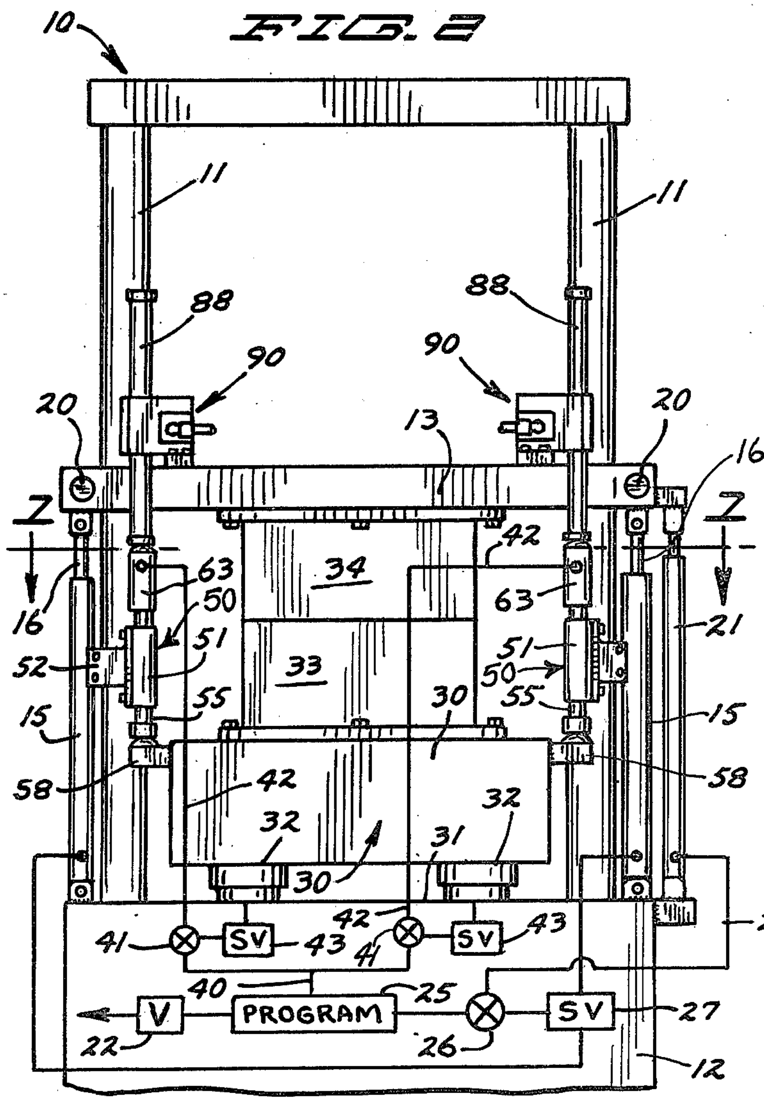
FIG. 3
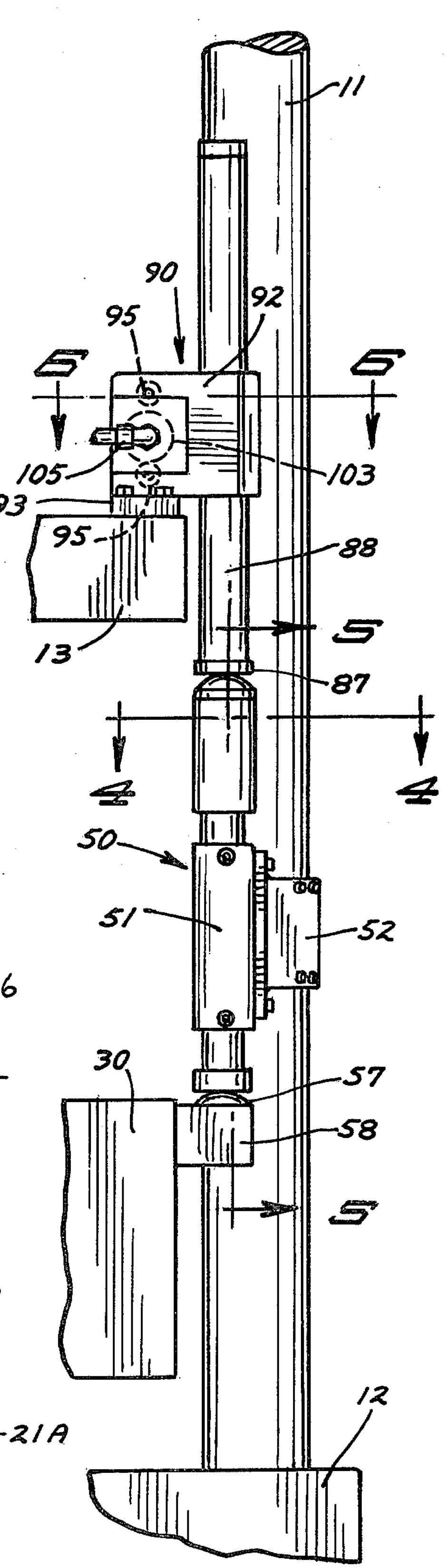

FIG. 4
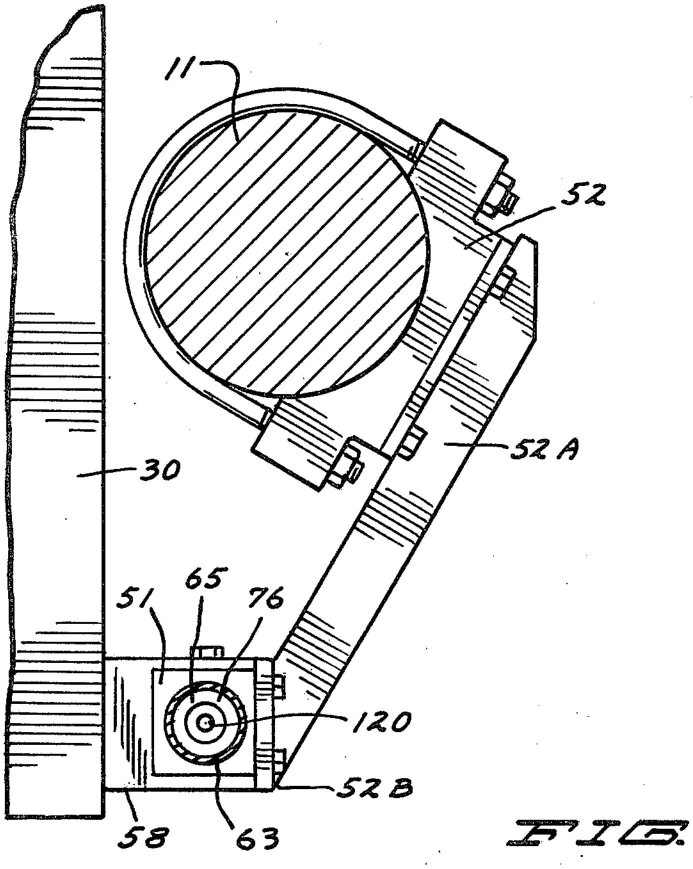
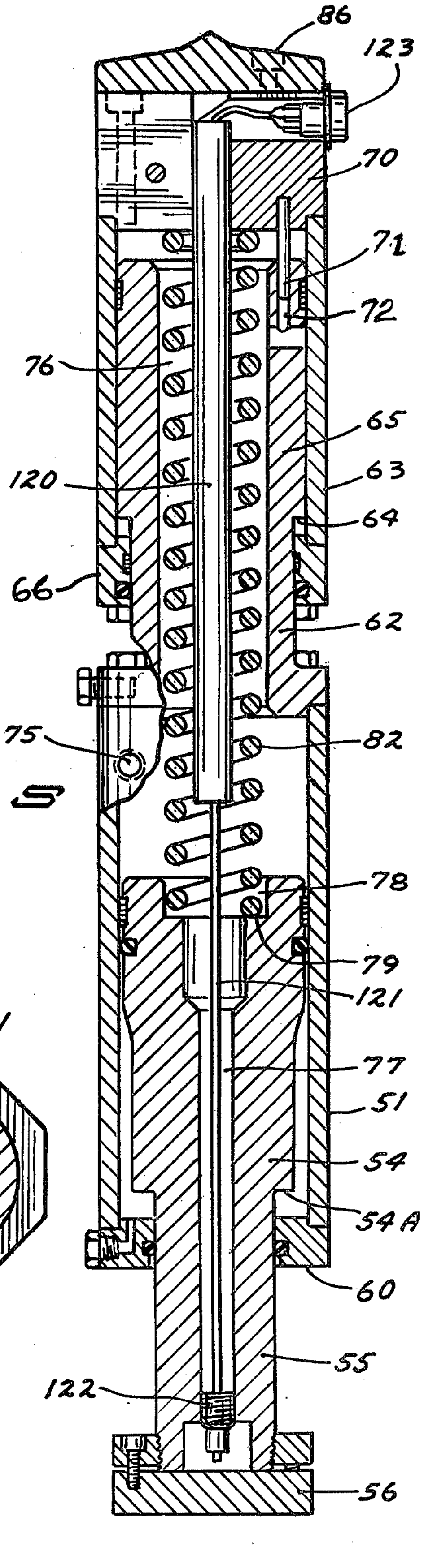
FIG. 5
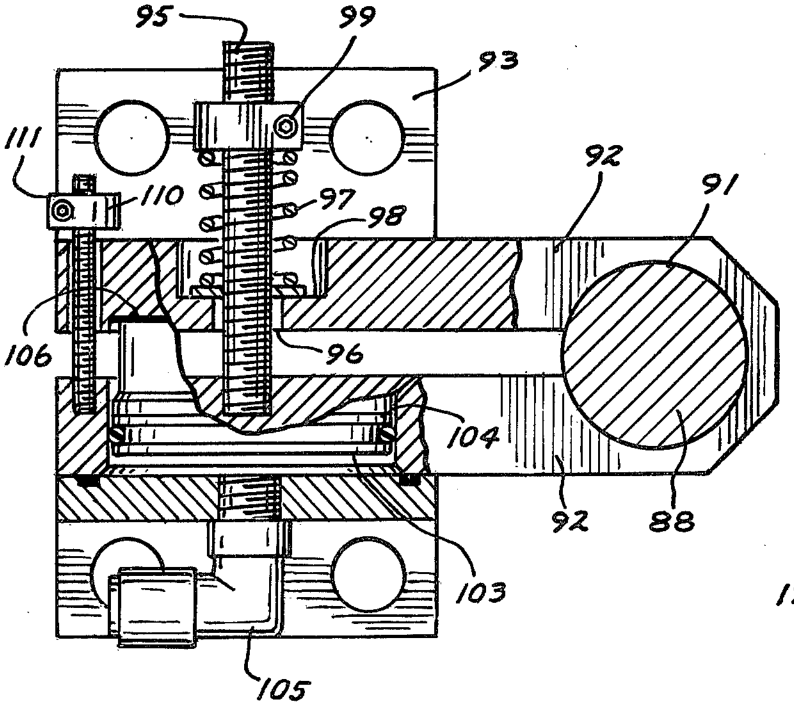
FIG. 6

CROSSHEAD AND BOLSTER SPACING CONTROL FOR SERVO CONTROLLED PRESS

BACKGROUND OF THE INVENTION

1. Field of the Invention

The present invention relates to a transducer arrangement for controlling two relatively movable parts wherein the parts move a substantial distance apart during part of their cycle, but as they move together precise control is necessary, as for example in the control of a molding press.

2. Description of the Prior Art

Prior U.S. patent application Ser. No. 493,651, filed May 11, 1983, for Hydraulic Press shows an SMC Press which has a platen or press crosshead slidable along four columns and which crosshead carries an upper half of a mold. A bolster mounted on the press base or frame carries the lower half of the mold, and the crosshead is movable a substantial distance along the columns to permit opening the mold for service. However, when the mold parts move together it is necessary to precisely control their spacing by regulating the hydraulic cylinders that exert the molding pressure. In the form shown in said prior patent application, it is necessary to have two sets of transducers and some type of a mechanical or electric switch for transferring the control from transducers which conrol the position of the lower mold half with respect to the press base, to transducers which control the spacing of the mold halves relative to each other. This must be accomplished with a minimum of transient disturbances in the control, and must be done while the actuators are active.

Other transducer mounting arrangements have been made for providing different reference planes to reference the position of two relatively movable parts after a load has been applied to one of the parts, using telescoping members but with hydraulic reset. Such a device is shown in U.S. Pat. No. 3,839,944. However, automatic switching of the reference positions when the two parts move close to each other is not obtained.

The transducer described herein will provide the necessary control signals as set forth in prior application Ser. No. 493,651, and the control arrangement for maintaining parallel relationships between the two mold parts, as well as controlling the molding forces, as described in said application.

SUMMARY OF THE INVENTION

The present invention relates to a transducer arrangement and a mounting therefore which provide a displacement feedback signal for example for controlling hydraulic actuators under servovalve controls. The transducer signal indicates the relative position of two relatively movable transducer mounting members. Both transducer mounting members are slidably mounted on a housing and the housing forms a reference member. The transducer mounting members are urged apart, but are stopped from extending beyond a set amount. Thus when one of the transducer mounting members is against its stop (a reference position) and the other mounting member is positioned by an external member, the position of the external member is indicated relative to the reference position. When both transducer mounting members are positioned by external members the LVDT transducer carried by the transducer mounting members indicates the position of the two external parts. In other words the transducer will indicate the position of one part relative to a base, for example, and automatically indicate the spacing of two parts as the second part moves into a closely adjacent relationship to the first part.

Specifically as disclosed herein, the transducer mounting is for mounting an LVDT, which is a well known transducer providing an electrical signal proportional to displacement between two members. The transducer is arranged so that it can be used with a molding press wherein the upper crosshead of the press is slidably mounted toward and away from the base of the press along columns and can be clamped or held relative to the columns when it is in a reference position for molding. One mold part (base mold half) is mounted on a bolster and servo controlled hydraulic molding actuators are provided between the base and the bolster (and base mold part) to exert a controlled molding force that provides the molding pressure once the crosshead has been properly positioned so that the second or upper mold part is closed to the first mold part.

The crosshead has to be lifted a substantial distance for charging the mold and taking out parts. The molding actuators must be under feedback control at all times and this requires a feedback signal indicating the position of the bolster and base mold part relative to the base of the press.

When the mold parts move together, in order to achieve the necessary accuracy it is required that one mold part be position controlled relative to the other mold part as far as spacing and parallel relationship is concerned, during the mold closing operation. In the form disclosed, the mold parts are controlled as to spacing in four corner locations to permit the spacing and the parallelism relationship between the mold parts to be controlled.

The present invention provides one set of transducers for control of the mold parts. The set includes four separate transducers, one at each of the corners of the mold. The transducer mounting of the present invention permits control to switch from providing a position feedback reference relative to the mold base to providing a position feedback reference between the two mold parts automatically, and without any bump or ripple in signals during the transition.

The transducer mounting assembly provides a unique mounting for an LVDT transducer that permits the standard transducers to automatically indicate position from one reference to another without having a mechanical switch that transfers the signals.

BRIEF DESCRIPTION OF THE DRAWINGS

FIG. 1 is a sectional top view of a press schematically showing the arrangement of a press base, support columns and transducers made according to the present invention and taken as on line 1—1 in FIG. 2;

FIG. 2 is a side elevational view of the device of FIG. 1 showing the crosshead schematically represented for illustrative purposes along with a schematic representation of controls used therewith;

FIG. 3 is an enlarged side view of one corner of the press of FIG. 2;

FIG. 4 is a sectional view taken as on line 4—4 in FIG. 3;

FIG. 5 is a sectional view taken as on line 5—5 in FIG. 3; and

FIG. 6 is a sectional view of a friction mounting arrangement for a reference member carried by the crosshead taken on line 6—6 in FIG. 3, with parts broken away to show the construction.

DETAILED DESCRIPTION OF THE PREFERRED EMBODIMENTS

Referring to FIG. 1, a molding press indicated generally at 10 is shown only schematically, and includes a press base 12 that supports four upright columns 11, which as shown are arranged vertically. An upper crosshead 13 is slidably mounted on the columns 11, similar to the manner shown in U.S. patent application Ser. No. 493,651, filed May 11, 1983, for Hydraulic Press.

The mounting of the crosshead 13 is shown only schematically, and as schematically shown, the movement of the crosshead in a vertical direction along the columns is controlled with hydraulic cylinders 15 that are mounted to the base 12 and have rods 16 that are extendable or retractable and which are connected to the crosshead 13 on the outside of the columns. The crosshead 13 has hydraulic clamps indicated only schematically at 20 thereon that can be operated to clamp the crosshead 13 to the columns 11, when the crosshead has reached a desired position for molding or for mold charging. The position of the crosshead relative to the base 12 can be sensed through the use of a standard displacement transducer (called an LVDT) indicated at 21 to provide feedback control for the cylinders 15. The clamps 20 also are controlled through a servovalve 22 controlled as shown in the previously mentioned U.S. patent application Ser. No. 493,651.

Schematically, the position of the crosshead 13 can be controlled from a central program control 25 operating through a summing junction 26 which provides an error signal to a servovalve 27. The summing junction 26 sums the feedback signal from the transducer 21 along line 21A and the program control signal for the crosshead from program control 25 and then the servovalve 27 drives the cylinders 15 to their desired position. Once they are in their desired position the clamps 20 are locked by a signal from control 25 to solenoid valve 22. The clamps 20 also are released by a program signal to valve 22 at the time that the cylinders 15 are being actuated. Again this is only shown schematically herein.

A press bolster indicated at 30 is supported relative to the upper surface 31 of the base 12, and is controlled in its movement vertically or in direction parallel to the axes of the columns 11 through the use of a plurality of relatively short stroke hydraulic actuators 32. There are one of these actuators 32 at each of the four corners of the bolster, and only two are shown in FIG. 2.

The bolster 30 has a first or base mold section 33 mounted on the upper surface thereof, and a second or upper mold section 34 is mounted on the lower surface of the crosshead 13. The second mold section 34 mates with this first mold section 33 for compression molding purposes.

The molding force is controlled by the hydraulic actuators 32,32 and thus these actuators have to be controlled at all times through servovalve controls. This requires a feeedback signal indicating the position of the bolster and lower mold section 33 relative to a selected reference.

As shown, a program signal for each of the actuators 32 is provided along lines 40 (this includes four lines, one for each actuator) to summing junctions 41. Feedback signals along lines 42 from transducer assemblies indicated generally at 50 are provided to control servovalves 43 that in turn control flow to the respective cylinders 32.

When the mold sections 33 and 34 are close together, and the crosshead 13 is held in position by clamping the clamps 20, the control for the actuators 32 is maintained by sensing the distance between the two mold sections 33,34 and as the program along line 40 dictates, the molding force is provided to the lower mold section 33 through the actuators 32. The position of the mold sections relative to each other is maintained to keep the mold sections parallel and to maintain and control spacing and the force urging the mold sections together. Force control is accomplished by measuring the pressure being exerted by each of the cylinders 32.

In any event, when the molding operation is completed, the crosshead 13 is unclamped and moved upward along the columns 11. The mold sections then separate for such a distance that the feedback for control of the cylinders 32 must be obtained by sensing the spacing of the bolster (and thus the first mold section) relative to the base 12. In the previously mentioned application Ser. No. 493,651, this was done by having two sets of transducers, one of which controlled the molding actuators such as 32 with a feedback signal indicating the bolster position relative to the base when the crosshead was raised, and another set of transducers that indicated the position of the mold sections relative to each other when the crosshead was locked in molding position. The final closing of the mold is done by measuring the position of the mold sections relative to each other in said prior application.

The actual controls are shown only schematically herein because the feedback signal from the transducer of the present invention can be provided to any desired control arrangement for the two relatively movable parts.

Each of the transducer assemblies 50 has an outer housing 51 that is attached with a suitable support clamp 52 to the respective column 11. The clamp 52 includes a "U" bolt that securely clamps a lateral bracket arm 52A that has a plate 52 at its outer end which is fastened to the exterior of the housing 51.

As can be seen there are four such transducer assemblies 50, one at each of the corners of the press assembly. The outer housing 51 of the transducers have square cross sections for ease of mounting and to restrain relative rotation. Each housing 51 is used to mount two independently movable (telescoping) members, so that the housing provides a reference base for the sensing of movements relative to the transducer housing within limited ranges, as will be explained, at both the top and bottom of the respective housing.

Each housing 51 has an internal slidable (telescoping) guide member 54 mounted therein which is slidably guided in the housing and includes an outwardly extending shaft or rod portion 55. The member 54 is mounted in a suitable manner so that it will slide axially along the interior of the housing 51, as shown in FIG. 5, and the outer end of the rod portion 55 has a sensor pad 56 mounted thereon. The pad 56, as shown in FIG. 3 is positioned so that it will engage a pad 57 mounted on a block 58 which in turn is fixed to the bolster 30. The bracket 52 is attached to the column 11, and is positioned at a desired location, so that when in operation the internal portion of member 54 is raised up from an end cap 60 on the lower end of housing 51 as shown in FIG. 5.

At the opposite end of the housing 51, there is a tubular shaft member 62 fixedly mounted relative to the housing 51 and extending upwardly therefrom. The shaft 62 has an upper head section 65 which is of larger diameter than its base, and a sleeve or housing 63 is mounted over the shaft section 63 and slidably mounted relative thereto for movement toward and away from the housing 51.

The outer end section 65 of the shaft 62 forms a shoulder surface 64 and the housing 63 has a cap 66 at its lower end which surrounds the lower portion of the shaft 62 and which will engage and stop mechanically against the shoulder 64 when the housing 63 is pulled upwardly. The cap 66 can be split so that it can be installed around the head section 65 of the shaft 62.

The upper end of the housing 63 has a mounting block 70 mounted thereon. The block 70 in turn has a locater pin 71 fixed thereon which slidably fits into a bore 72 in the end of the head section 65 to keep the two relatively slidable members properly located. Suitable bearings or bushings as well as O rings for sealing can be provided on the head section 65. The member 54 also may have anti friction bushings and "O" rings thereon as desired. Bleed holes, such as that shown at 75 in housing 51, can be provided in both housings to provide for venting.

The shaft 62 is tubular and has an interior through bore 76, as shown, which extends along a central axis of the housing. The member 54 and its shaft portion 55 also have a central axial bore 77 as shown. The bore 77 aligns with bore 76 and has a wider end bore portion 78 which is surrounded by an interior shoulder surface 79. A spring 82 is mounted on the interior of the bore 76 and extends into the interior of the housing 55, and into the bore portion 78. One end of the spring 82 abuts against the shoulder 79, and the other end abuts against the block 70 of housing 63. The spring then tends to separate the shaft 55 and the housing 63 and force them to stopped positions along the longitudinal axis of the housing 51.

The block 70 has a compression carrying pad 86 at its end, and the pad 86 is positioned to engage a pad 87 on the end of a rod 88 that is carried by the crosshead 13 through a friction clamp assembly 90. The rod 88 moves with the crosshead 13 and when the rod 88 engages the pad 86, it is known that the crosshead 13 is moving close to the position where the crosshead will be clamped for molding.

The clamp 90 is a split clamp forming a safety friction clamp. There is a rod 88 at each corner of the press and each rod 88 is mounted in a bore 91 of a separate clamp 90 as seen in FIG. 6. A pair of clamp legs 92 form a split clamp and extend laterally out from the bore 91 and rod 88. One of the legs 92 is supported on a base plate 93 which in turn is fixed to the upper surface of the crosshead 13 in a suitable manner. As shown in FIG. 6, the clamping acition on the rod 88 is accomplished by tending to force the legs 92 together under spring load. The spring load is applied through a pair of threaded rods 95, each of which has one end threaded into the same one of the legs 92. The rods are shown spaced apart in FIG. 3. The rods pass through apertures 96 on the other one of the legs 92. A separate spring 97 is mounted over each of the rods 95 and bears against a shoulder 98 surrounding the respective aperture 96, and is held on the threaded rod through the use of an adjustable cap 99 so that the force of the springs will tend to pull on the rods under the spring force and tend to force the legs together. In this way, a controlled spring is exerted on the rod 88, so that the amount of force necessary to move the rod along its longitudinal axis is regulated at a safe level.

To release the clamp assemblies 90, fluid under pressure is introduced into a chamber 103 which has a piston 104 mounted therein. The chamber 103 is in the first of the legs 92, and when fluid under pressure is introduced through a fitting 105 to the chamber 103 the piston 104 will be forced toward the second of the legs 92, and will engage the base of a recess in the second leg 92, as shown at 106, tending to force the legs 92 apart, opening the bore 91 and releasing the rod 88 and permitting it to be moved longitudinally.

A stop rod indicated at 110 is provided to limit the separation of legs 92 as well and has a stop collar 111 thereon. Note that the stop rod 110 is threaded into the first of the legs 92, and passes through an aperture in the second of the legs with the collar 111 on the outside of the second of the legs to prevent excessive separation.

The threaded rods 95 are positioned on opposite sides of the cylinder 103, and the parts broken away in FIG. 6 show the engagement of the piston 104 with the second of the legs 92 to provide a separating force for the legs.

A linear displacement transducer (LVDT) indicated at 120 is mounted on the interior of the transducer assembly 50, and has its base end held in block 70 in a suitable manner, and includes a telescoping rod 121 which is attached as at 122 to the outer end of the shaft 55. Note that the transducer extends through the center of the spring 82. The transducer 120 is of a conventional design that provides an electrical signal through a fitting 123 to the servo controls along line 42, in proportion to its length or extension.

Because the movement of the crosshead 13 and clamping it in working location is programmed sufficiently accurately so that when it is clamped in working location, the rod 88 has engaged the pad 86 and the housing 63 has been moved to a position so that the shoulder 64 and the inner edge of the cap 66 are spaced. The bracket or clamp 52 is mounted so that across the entire movement of the actuators 32 the pad 56 will engage the member 57 and the shoulder 54A will be moved upwardly from the cap 60. Thus when the crosshead 13 has been clamped in its working (molding) location the signal from the transducer though line 41 will indicate the actual spacing between the mold sections 33 and 34. Because the crosshead is clamped in position and carries the mold section or part 34, the position of the bolster will be sensed by movement of the rod portion 55 which in turn will cause the rod 121 of the transducer 120 to telescope relative to the transducer body and provide a signal indicating any shift in the spacing of the two mold sections or parts.

The controlled movement of the actuators 32 will be sensed by the transducer and shaft 55 will be moved relative to the housing 51 to sense this movement. The feedback signal provides displacement signals to provide closed loop control in relation to the program signal.

When the programmed mold cycle is completed and the crosshead 13 is unclamped and then raised by cylinders 15, the pad 86 and housing 63 will follow the rod 88 until the cap 66 engages (stops against) the shoulder 64. At that point, it can be seen that the spring 82 urges the parts 63 and 62 to stop at a fixed position because the shoulder 64 provides a stop surface. This means that the end of the transducer 120, which is carried in block 70, will be fixed relative to the housing 51. The signal along line 42 from the transducer 120 will indicate only shifts in position of the first or lower mold section 33, as the bolster 30 is moved or changed in position by the actuators 32. The crosshead 13 can go all the way to the top of the columns, and the transducer assembly 50 operates as if the crosshead still was touching it at its reference position where the shoulder 64 contracts the cap 66. The actuators 32 remain under positive feedback control and will not be overly extended or permitted to collapse, because any movement of the bolster caused by shifting of the actuators 32 will be sensed by movement of shaft 55 and the transducer 120 to provide a feedback signal to the servovalve 43 so that the program from the program control circuit 25 will be followed precisely.

When the crosshead 13 is again lowered, its lowering will be controlled by the transducers 21 and the cylinders 15 until it reaches the desired location in accordance with that program and clamped in position. At such time it will have moved the housing 63 axially downward so that the cap 66 moves away from and is spaced from the shoulder 64 substantially as shown in FIG. 5. The displacement changes are then sensed between the two movable pads 56 and 86 (between the bolster and the crosshead) and the spacing that is being controlled is the spacing between the two mold sections or parts.

The clamp assemblies 90 provide controlled holding force on the rods 88 so that if, for example the crosshead 13 was lowered excessively and the housing 63 collapsed to load the housing 51 in compression, the rod 88 would be slid as a safety type device to prevent damage to the transducer assembly.

Although the present invention has been described with reference to preferred embodiments, workers skilled in the art will recognize that changes may be made in form and detail without departing from the spirit and scope of the invention.

What is claimed is:

1. A transducer mounting for sensing the relative position of two parts relative to each other, wherein at least one of the parts also moves relative to a reference comprising a first housing adapted to be mounted at a known location with respect to a reference support, a first shaft telescopically slidably mounted inside said first housing and extending from one end thereof for movement along a first axis, first stop means cooperating between said first shaft and said first housing for limiting sliding movement of the first shaft relative to the first housing in a first direction, a second shaft fixed to said first housing and extending from an end of said first housing opposite from the first shaft, a second housing slidably mounted on said second shaft and movable along an axis generally parallel to the first axis, second stop means cooperating between said first housing and said second housing for limiting sliding movement of the second housing relative to the first housing in a second direction opposite from the first direction, bias means urging said first shaft and second housing to separate, and a linear displacement transducer connected to sense the relative positions between said first shaft and second housing.

2. A multiple reference transducer assembly comprising a first housing, said first housing having a longitudinal axis and first and second opposite ends, a first member telescopingly mounted relative to said housing and protruding from a first of said ends and movable along said axis, first stop means to limit the movement of said first member in a first direction along said axis away from said housing, a second member, means for telescopingly mounting said second member relative to said housing adjacent a second end thereof and movable in a direction along said axis, second stop means for limiting the movement of said second member relative to said housing in direction away from said first member, bias means mounted between said first and second members for urging them in direction away from each other, and against the respective stop means so that absent external forces both the first and second members assume reference positions relative to the housing, a displacement sensor connected between said first and second members to sense the relative position of said first and second members throughout the range of movement of the first and second members, and means to mount said housing at a reference location, said first and second members being adapted to engage and be moved by separate relatively movable external members which are also relatively movable in relation to the housing.

3. The assembly of claim 2 wherein said housing comprises a tubular section, and said first member is telescopingly mounted within said tubular section.

4. The assembly as specified in claim 3 wherein said means for telescopically mounting comprises a shaft portion fixed to said housing, and said second member is a tubular sleeve member slidably mounted relative to said shaft portion, said shaft portion having a shoulder thereon spaced from the housing, and said shoulder engaging a surface of said sleeve member forming said second member when the sleeve member is extended a preselected amount.

5. The assembly as specified in claim 4 wherein said shaft portion is tubular, and said bias means comprises a spring mounted within said shaft portion and bearing against said first and second members.

6. The assembly as specified in claim 2 wherein said displacement sensor comprises a linear displacement transducer mounted directly to said first and second members and extending through the center portions of said housing.

7. A transducer mounting for sensing the position of two parts relative to each other, wherein one of the parts moves relative to a reference comprising a first tubular housing having first and second ends and adapted to be mounted at a known location with respect to a reference support, a first shaft slidably mounted relative to and within said first housing for movement along a first axis and extending from a first end of said first housing, a fixed shaft mounted on the first housing and extending outwardly therefrom, a second housing slidably mounted over the fixed shaft and movable relative to said first housing and extending in an opposite direction from the first shaft and movable along an axis generally parallel to the first axis, bias means urging said first shaft and second housing to separate, a linear displacement transducer connected to sense the relative positions between said first shaft and second housing, and stop means to limit the amount of relative movement of the first shaft and second housing relative to each other and relative to the first housing.

8. The mounting as specified in claim 7 wherein said stop means comprises cooperating shoulder means between said fixed shaft and said second housing.

* * * * *